(12) United States Patent
Mestha et al.

(10) Patent No.: US 8,547,613 B2
(45) Date of Patent: Oct. 1, 2013

(54) COMPENSATING FOR PRINT ENGINE CHANGE IN A DOCUMENT REPRODUCTION DEVICE

(75) Inventors: Lalit Keshav Mestha, Fairport, NY (US); Martin S. Maltz, Rochester, NY (US); Yao Rong Wang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 440 days.

(21) Appl. No.: 12/915,217

(22) Filed: Oct. 29, 2010

(65) Prior Publication Data

US 2012/0105927 A1    May 3, 2012

(51) Int. Cl.
*H04N 1/60* (2006.01)
*G03F 3/08* (2006.01)
*G06K 9/00* (2006.01)

(52) U.S. Cl.
USPC ............. 358/529; 358/1.9; 358/523; 382/167

(58) Field of Classification Search
USPC .................. 358/1.9, 518, 523, 530, 501, 502, 358/504; 382/167, 162
See application file for complete search history.

(56) References Cited

U.S. PATENT DOCUMENTS

| | | | |
|---|---|---|---|
| 7,030,888 B1 * | 4/2006 | Edge et al. | 345/604 |
| 7,057,765 B1 * | 6/2006 | Fischer et al. | 358/1.9 |
| 7,768,682 B2 * | 8/2010 | Mestha et al. | 358/518 |
| 7,952,759 B2 * | 5/2011 | Wang et al. | 358/1.9 |
| 8,023,156 B2 * | 9/2011 | Mestha et al. | 358/3.23 |
| 8,228,556 B2 * | 7/2012 | Mestha et al. | 358/1.9 |
| 8,441,685 B2 * | 5/2013 | Wu et al. | 358/2.1 |
| 2005/0036171 A1 * | 2/2005 | Bala et al. | 358/2.1 |
| 2005/0281459 A1 * | 12/2005 | Bala et al. | 382/162 |
| 2008/0144054 A1 * | 6/2008 | Van de Capelle et al. | 358/1.9 |
| 2008/0145125 A1 * | 6/2008 | Mestha et al. | 400/76 |
| 2008/0252931 A1 | 10/2008 | Mestha et al. | |
| 2008/0253649 A1 * | 10/2008 | Wang et al. | 382/167 |
| 2009/0185230 A1 | 7/2009 | Mestha et al. | |
| 2009/0296107 A1 | 12/2009 | Mestha et al. | |
| 2009/0296113 A1 * | 12/2009 | Mestha et al. | 358/1.9 |
| 2009/0296153 A1 | 12/2009 | Wang et al. | |
| 2009/0296159 A1 * | 12/2009 | Mestha et al. | 358/3.26 |
| 2011/0032545 A1 * | 2/2011 | Mestha et al. | 358/1.9 |
| 2011/0317915 A1 * | 12/2011 | Gil | 382/167 |
| 2012/0086959 A1 * | 4/2012 | Wu et al. | 358/1.9 |

OTHER PUBLICATIONS

Dianat et al., "Dynamic Optimization Algorithm for Generating Inverse Printer Maps With Reduced Measurements", IEEE publication, Rochester Institute of Technology, Rochester, NY 14623, Xerox Corporation, (May 14-19, 2006).

* cited by examiner

*Primary Examiner* — Madelein A Nguyen
(74) *Attorney, Agent, or Firm* — Philip E. Blair; Fleit Gibbons Gutman Bongini & Bianco P.L.

(57) ABSTRACT

What is disclosed is a novel system and method of inheriting intended GCR into a 4-to-4 cascaded LUT to compensate for print engine change which adversely impacts the quality of an output print. The present method uses the device link transform to generate starting LUT nodes for the inverse of the drifted printer model by inputting CMYK or RGB into the device link at a color space resolution sufficient to determine output nodes. Lab and CMYK values are derived from this process, and a "starting LUT" is created at the Lab destination nodes. An iterative control begins with this starting LUT to produce an inverse drifted printer model that contains a close approximation for the intended GCR. The present method captures the intent of the device link transform for a fleet and generates the cascaded LUT for drift, specific printer, side1/side2, and other modes leading to special GCRs.

8 Claims, 7 Drawing Sheets

COMPENSATING FOR PRINT ENGINE CHANGE IN A DOCUMENT REPRODUCTION DEVICE

TECHNICAL FIELD

The present invention is directed to systems and methods for compensating for a determined amount of change in a print engine, such as print engine drift, which adversely impacts the quality of an output print rendered by a document reproduction device.

BACKGROUND

To meet customer demands, image output devices such as a printer or display need to produce a consistent spectrum of colors over time. For example, customers want a printing system to produce a particular colored document consistently from day to day, or print job to print job. To control the color rendering consistency of a printing device, the printing device is typically characterized and calibrated prior to being shipped to a customer. The characterization and calibration process produces a set of LUTs (look-up tables) which correlate a standardized set of target colors with the appropriate device dependent color space values necessary to produce the target colors with the printing device. For example, a Pantone® color spectrum may be utilized as a color target reference and the LUTs produced by the characterization and calibration process are device dependent CMYK color space representations of the Pantone target colors. This characterization and calibration process is generally referred to as profiling a device or printer. To accomplish the profiling of a printing device, a spectrophotometer or other image sensing device is used to measure the colorimetric properties of the produced images. These measured colorimetric properties provide an objective basis of comparison to the reference target color set and provide the necessary feedback to iteratively generate accurate device dependent LUTs. Stated another way, device independent CMYK values are correlated to the reference target color set, and the LUT correlates the reference target color set device independent CMYK values to the device dependent CMYK values. Device profiling can also be applied to a display where an image sensing device is approximately located to the display for colorimetric measurements of the displayed image. In addition, multiple LUTs may be generated for an image output device to account for multiple media types and/or half tone screens.

One primary goal of the color management system is to effectively transform variety of images to device CMYK color separations for printing by the engine. In a cascade strategy, a fleet profile that represents a typical printer and having many profiling strategies incorporated with appropriate GCR converts the images to a set of typical CMYK. The engine takes this set of typical CMYK and converts to its own device cmyk for printing. Advantages of a cascade strategy are that It can have one DFE with the fleet profile to drive a set of engines so that cost will be lower and it has a clean separation between the DFE and the engine so that development of the DFE and the engine color management system can be separated. When the engine changes or drifts the 4×4 needs to be updated to account for the change. A usual way of updating the 4×4 is to print the printer model patches for the engine, construct a printer model, and then re-compute the 4×4. However, since the printer model typically has about 2 deltaE2000 error, a more accurate way to update the 4×4 is by iterating a set of patches that can be projected to the 4×4 on the printer. The above-mentioned problem of inheriting color management intent from a fleet color management LUT into a 4×4 cascaded LUT of an individual engine remains to be addressed.

Accordingly, what is needed in this art are systems and methods for compensating for an amount of print engine change, such as engine drift, which adversely impacts the quality of an output print rendered using a document reproduction device.

INCORPORATED REFERENCES

The following U.S. patents, U.S. patent applications, and Publications are incorporated herein in their entirety by reference.

"Method, Apparatus and Systems to Retrieve GCRs from a Historical Database", U.S. Patent Publication No. 20090296107, to Mestha et al.

"Image Output Color Management System and Method", U.S. Patent Publication No. 20080252931, to Mestha et al.

"Methods, Apparatus And Systems For Blending Multiple GCRS", U.S. Patent Publication No. 20090296153, to Wang et al.

"Method And Apparatus For Optimum Black Component Determination For Gray Component Replacement", U.S. Patent Publication No. 20090185230, to Mestha et al.

"*Dynamic Optimization Algorithm For Generating Inverse Printer Maps With Reduced Measurements*", IEEE publication, by Dianat et al., Rochester Institute of Technology Rochester, N.Y. 14623, Xerox Corporation, (May 14-19, 2006).

BRIEF SUMMARY

What is presented is a system and method to inherit the GCR from the DFE to create a GCR constrained 4×4 CMYK to CMYK LUT on a print engine which has drifted. If access is available to the DFE profile (e.g., colorimetric profile or LUT) which is used in the DFE then that LUT is used as the inherited GCR LUT. Methods for retrieving GCR LUTs from a seed profile or from a historical database or from a colorimetric profile LUT is described in the above-incorporated references. If access is not available to the DFE profile then additional process steps in the 4×4 workflow are needed in which a patch file (e.g., RGB or L*a*b*) is processed through the DFE profiles to extract device CMYK values. Also described herein are two different workflows (RGB and CMYK). The DFE will contain a fleet destination profile (i.e., L*a*b* to CMYK transform). It is constructed using a Gray Component Replacement (GCR) which has been optimized for a particular print engine. Choice of GCRs in the DFE profiles is important. For example, maximum-K GCR can lead to graininess in the flesh tones, but may be useful to save toner cost (i.e., the total cost of consumables) since black is generally less expensive. The GCR and printer model LUT are inherited from the Digital Front End (DFE) to create a GCR constrained 4-to-4 CMYK-to-CMYK profile LUT. If access is not available to the DFE profile then an additional step in the 4×4 workflow is needed in which a patch file (e.g., RGB or CMYK or L*a*b*) is processed through the DFE to extract GCR CMYK values. The GCR LUT is then used as the starting LUT in an Advanced Profiling Algorithm to create a 3-to-4 L*a*b*-to-CMYK LUT which is then concatenated with the fleet printer model to obtain a desired 4×4 CMYK-to-CMYK LUT. Normally, GCR inheritance is required every time GCR changes. The 4-to-4 CMYK-to-CMYK LUT is used serially in the image path to overcome changes in the print engine, such as engine drift. Sometimes media specific LUTs may be necessary. Ideally, these LUTs are expected to preserve the GCRs used by DFE fleet profiles as closely as possible while creating new CMYK recipe on the engine.

In one example embodiment, the present method for compensating for an amount of print engine change involves performing the following. A fleet destination profile is constructed using a gray component replacement strategy which has been optimized for a given print engine of a document reproduction device. The fleet destination profile is stored in a digital front end of a cascaded color management system. Thereafter, an amount of change for the given print engine is determined and compared to a predetermined threshold. If the amount of change determined for this print engine is above the predetermined threshold then the following are performed. The stored fleet destination profile is retrieved from the digital front end and a gray component replacement constrained 4-to-4 CMYK to CMYK profile LUT is created. In various embodiments, the gray component replacement constrained 4×4 profile LUT is created by creating a 3-to-4 L*a*b* to CMYK profile LUT and concatenating this 3×4 profile LUT with a fleet printer model. The created gray component replacement constrained 4×4 profile LUT is then used to produce CMYK values which, in turn, are provided to the print engine. The print engine then uses the generated CMYK values to compensate for the amount of change thus maintaining color consistency in the document reproduction device. Measurements may be obtained from a color sensing device and used to update the gray component replacement constrained 4×4 profile LUT.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a novel system and method for compensating for a determined amount of change in a print engine which adversely impacts the quality of an output print rendering by a document reproduction device.

It should be understood that one of ordinary skill in this art would be readily familiar with many facets of color science and image processing, optimization theory, and other techniques and algorithms known to the color science arts. Those of ordinary skill would be familiar with the text: "*Digital Color Imaging Handbook*", 1st Ed., CRC Press (2003), ISBN-13: 97808-4930-9007, and "*Control of Color Imaging Systems: Analysis and Design*", CRC Press (2009), ISBN-13: 97808-4933-7468, both of which are incorporated herein in their entirety by reference.

NON-LIMITING DEFINITIONS

A "Device-Independent Color Space" is any standard color space that is commonly used to define or describe color, e.g. CIE XYZ, CIE L*a*b*, CIE L*u*v*, sRGB etc.

A "Device-Dependent Color Space" is a color space that is non-standard and cannot be used to commonly define colors without additional information such as the characteristics of the rendering device. For example, the commonly used CMYK color space for 4-color printers is a device-dependent color space since the rendering of a given CMYK color could yield very different (device-independent) colors from one model of a printer to another model of a printer. As another example, the non-standard RGB space is also a device-dependent color space since the rendering of an RGB image could appear differently from one model of a CRT monitor to another model of a CRT monitor.

"Color Separation" refers to an individual separation corresponding to one of the colorants of a target marking system. For example, there are 4 separations: C, M, Y, K for a 4-color CMYK printer. Combinations of all color separations can be used to produce a range of colors by the target marking system. A "single color separation" or "single-separation color" refers to a color specified with only one of the color separations for a target marking system. For example, for a CMYK printer, a C-only test patch is a single-separation color test patch. A "multi-separation color" refers to a color specified with more than one of the color separations for a target marking system. For example, for a CMYK printer, a red test color is a multi-separation color test patch, using combinations of M and Y separations at some pre-determined levels.

A "Color Profile" refers to a relationship between a color space and a color standard known in this art. A color profile may be used to transform a color space for a print job, printing device (based on a particular printing technology) or display device into, for example, a standardized color space, or vice versa.

An "ICC Profile" is a set of data that characterizes a color input or output device, or a color space, according to standards promulgated by the International Color Consortium (ICC). The ICC standard permits the exchange of output device characteristics and color spaces in the form of metadata. This allows the embedding of color profiles into code as well as storing them in a database or profile directory. The ICC specification is a vendor-neutral cross-platform color management standard which divides color devices into three broad categories: input devices, display devices, and output devices. For each device category, a series of base transforms are included in the profile that perform the conversion between different color spaces.

A "Destination Profile" provides a set of colorant values (e.g., CMYK) necessary to produce a given color (e.g., L*a*b*). The destination profile translates a standardized color space to the color space of a target marking device. For a 4-color (CMYK) printer, this is a 3-to-4 color transformation L*a*b*→CMYK which is "underdetermined", so for many colors there are in general multiple solutions, i.e., more than one CMYK combination that produces a given L*a*b*.

Even more combinations are possible when more than 4 colorants are used (e.g., CMYKOV).

A "Fleet Profile" is a printer model which converts from one color space to another color space for a target color marking system. A printer model can have the form of a look-up table (LUT) such as a 4-D LUT for a CMYK printer, or a parameterized fitted function such as a polynomial that relates inputs in device-dependent color space to outputs in device-independent color space. For CMYK color space as the target device-dependent color space and $L^*a^*b^*$ color space as the output device-independent color space, updating the forward printer model includes, for example, for each of a selected number of the nodes: (a) printing a patch using the specified CMYK components; (b) measuring the color $L^*a^*b^*$ of this printed patch; (c) compiling the relationship between this input CMYK specified and its corresponding measured output $L^*a^*b^*$ for each node; and finally (4) storing these compiled relationships of all the nodes in the form of a LUT. This LUT can now be used to map CMYK values in device-dependent color space to a predicted output $L^*a^*b^*$ in the device-independent color space of the target marking system.

Figure 2:
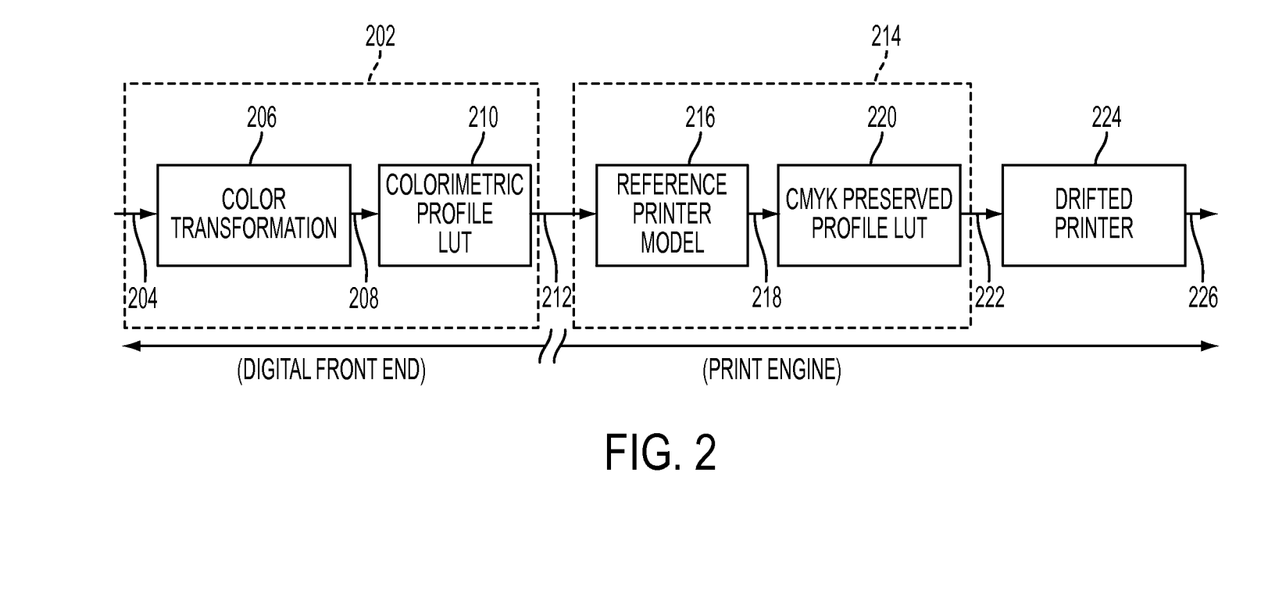
FIG. 2 is a block diagram view of an example DFE and Print Engine image path with 4×4 transform in the Print Engine.
Figure 3:
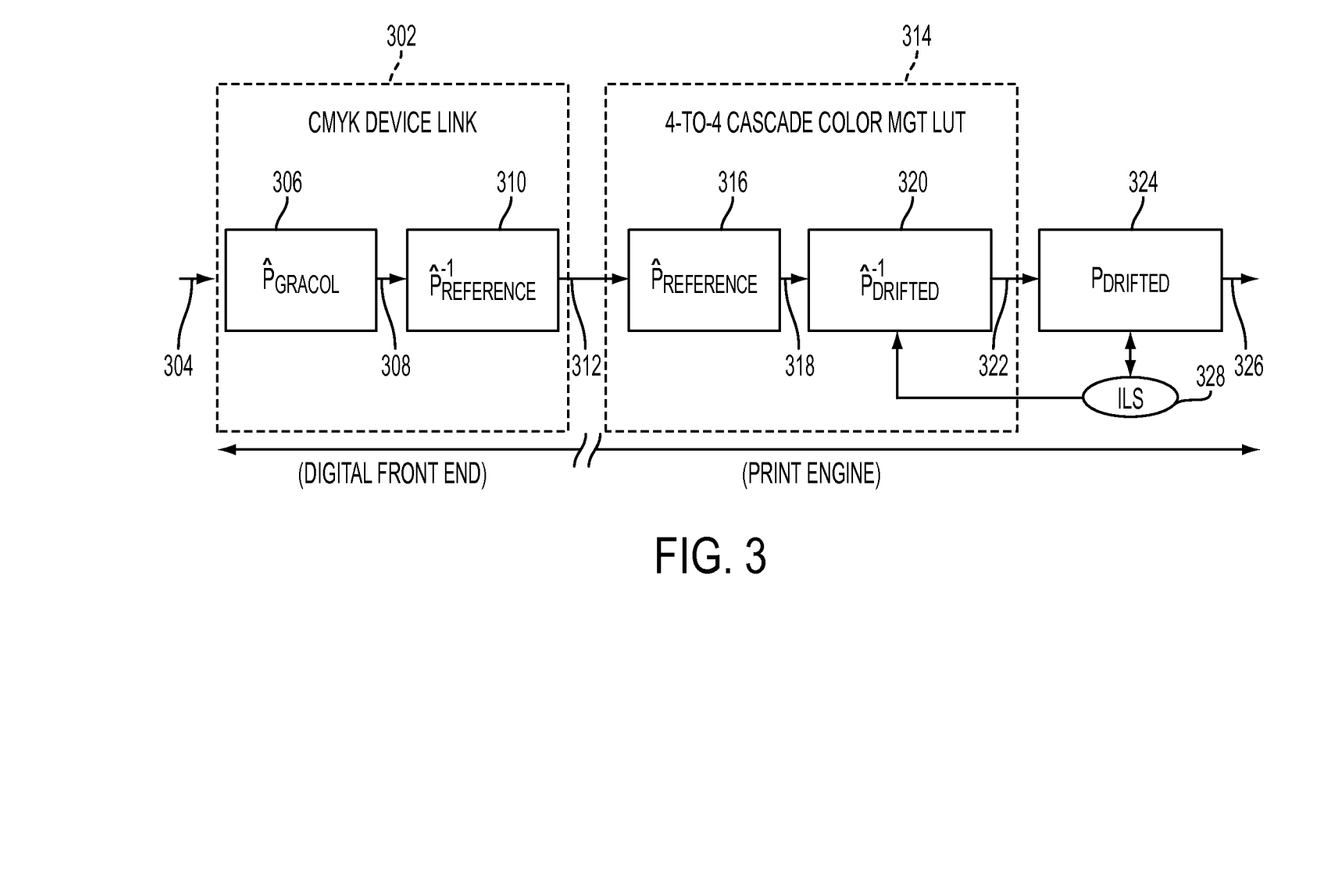
FIG. 3 is a block diagram which mirrors the configuration of FIG. 2 showing a printer model and inverse printer of printer models in the DFE and Print Engine Image paths.

A "Gray Component Replacement Strategy" or ("GCR Strategy") is a function or mapping which relates an amount of CMY to an amount of CMYK. Such a strategy is used to convert a set of CMY space parameters to CMYK space parameters which represent the colors of a typical four-color marking device. This typically leads to a 3-to-3 transformation which has a unique solution. There are a multiplicity of GCR strategies, each of which is equally valid from a colorimetric point of view. GCR methods are widely used to fine tune the use of CMYK separations for improving color reproduction in xerographic and n-color marking system and devices. Some key colors (e.g., black in flesh tones and sky tones) need less black. Sometimes, maximum gamut GCR is preferred over medium GCR to utilize the gamut fully. These adjustments are used during the construction of a colorimetric profile LUT ($L^*a^*b^*$/XYZ to CMYK). FIGS. 2 and 3 provide a block diagram view of the image path for printing CMYK images (e.g., GRACoL images) through a DFE.

"Color transformation" refers to the process of translating an input color space to an output color space. In conventional color management systems, a color transformation converts each input color space for a print job, on a color by color basis, into an output color space using mathematical algorithms represented by multiple color profiles: a first color profile converts an input color space to a standardized color space, and a second color profile converts the standardized color space to an output color space. The second color profile may be replaced with a color gamut error profile which converts the standardized color space to a scalar value or a vector representing an amount by which a color is out-of gamut. The mathematical algorithms of the color profiles for a color transformation may be convolved to produce a single mathematical algorithm to increase efficiency.

A "Document Reproduction Device" refers herein to a wide variety of print system device architectures. The set of print system devices includes monochrome or color digital document reproduction architectures, document scanning systems, a wide variety of printers/copiers, book/magazine/ newspaper, digital printing presses, and other multi-function document reproduction systems. Such systems generally include a display device such as a CRT or touch screen along with one or more user interfaces such as a keyboard, mouse, keypad, touchpad, and the like, for entering data and configuring device-specific settings to optimize image quality and performance. Such complex devices further incorporate an image processing or color management system for processing image data. The image processing system can be hardware or software. It should also be understood that one or more functions, features, or capabilities performed by a computer system or special purpose processor (such as an ASIC), may be integrated, in whole or in part, with such a color management system.

A "Digital Front End" or simply DFE, is an application that typically takes the form of a special purpose computer (such as an ASIC), as are widely known in the digital document reproduction arts. An example DFE is shown and discussed with respect to block 202 of the block diagram of FIG. 2.

A "Print Engine", as used herein, means any device that applies colorants to, or generates colorants in any surface to produce an image.

"Print Engine Drift" means any measurable change in any aspect of print engine or print device behavior over time which adversely impacts the quality of an output print.

A "Color Management System" utilizes various methods to achieve desired color reproduction results by giving a user more control of the color gamut mapping process. Such processes can be cascaded, i.e., there can be multiple devices involved in the pipeline with multiple mappings, for example, device A is mapped to device B first, and then device B is mapped to device C, and so forth. One example 4-to-4 cascaded color management LUT is shown and discussed with respect to block 214 of the block diagram of FIG. 2.

Profile Generation

Figure 1:
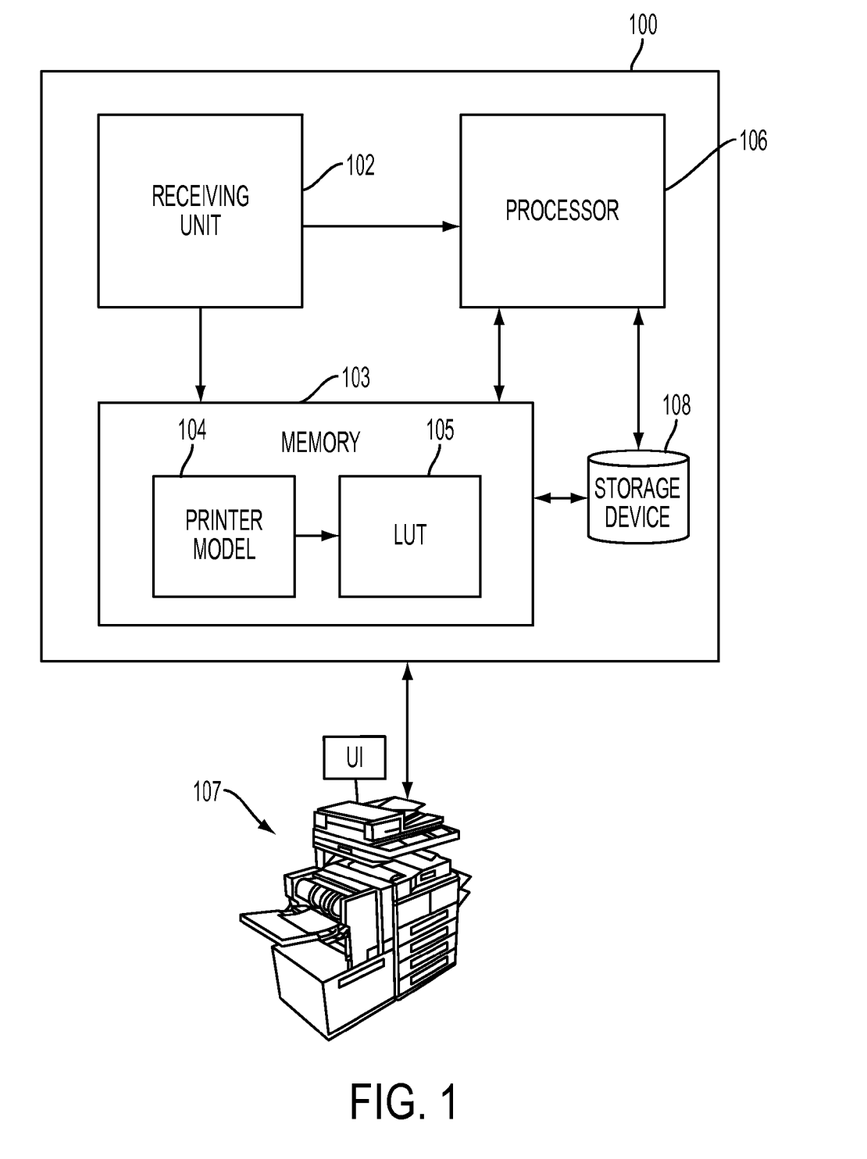
FIG. 1 is a block diagram showing an example system for generating a printer profile LUT.

Reference is now being made to FIG. 1 which illustrates a block diagram showing an example system for generating a printer profile LUT. In this embodiment, the system 100 includes a receiving unit 102 that receives color signals to be printed or output. The example system includes a processor 106 that can be configured to execute a wide array of machine readable program instructions including 3-to 4 output feedback controllers and 4-to-3 output feedback controllers. The processor also performs some or all of the steps necessary to generate LUT 105 stored in memory 103. Memory 103 receives color signals from receiving unit 102 and stores a printer model 104. The memory is shown in communication with a storage device 108. A lookup table (LUT) 105 is generated which is the optimized printer profile LUT for a given print engine. The embodiment of FIG. 1 is shown interfaced to an example printer device 107 and an example storage device 108. The optimized printer profile LUT 105 is generated using printer model 104 which, in turn, is either stored to storage device 108 or provided to target marking device 107. In other embodiments, the printer profile LUT 105 is optimized by processor 106 using a feedback control loop that includes print device 107. While the system of FIG. 1 is shown as being external to print device 107, it should be appreciated that system 100 can be incorporated, in whole or in part, as a system or sub-system within printer 107.

The process of generating a profile involves performing the following steps:
1) Extract $L^*a^*b^*$ values from the RGB→$L^*a^*b^*$ grid for the in-gamut nodes that require control parameters (e.g., gain matrix);
2) Get the desired GCR profile file (e.g., FILEiGen3_Medium_GCR.IccFILE);
3) Extract CMYK values from the desired GCR profile for nodes from step 1;
4) Obtain the most recent printer model (e.g., CMYK→$L^*a^*b^*$ LUT or model) for the printer (or class of printers) in which the GCR has to be reproduced;

5) Find the Jacobian and gain matrix for the printer model of step four at the nodes shown in step one using initial CMYK from step 3;

6) Run the control algorithm for several iterations on the printer model or printer for the nodes of step one using the gain matrix from step five and the initial CMYK from step 3. Typically 10 to 50 iterations are used to while iterating on the printer model sufficient to reach convergence on the printer model and two to four iterations are used while iterating on the printer when measurements are made on a media printed on a sheet fed press.

7) Filter CMYK values using smoothing algorithms;

8) Repeat steps 5 to 7 using initial CMYK (obtained in step 7);

9) Save the initial CMYK values for run time profile creation.

Example 4-to-4 Cascaded Strategy

In a cascade strategy, a fleet profile that representing a "typical" printer and having many profiling strategies such as the GCR incorporated converts the images to a set of "typical" CMYK. The engine takes this set of "typical" CMYK and converts to its own device cmyk for printing. The construction of the LUT from the "typical" CMYK to the engine device cmyk (4×4) will next be discussed. The CMYK to CMYK device link transform is constructed using a colorimetric destination profile LUT. The 4-to-4 CMYK to CMYK transform (also called cascaded strategy) is introduced again inside the print engine to provide compensation for interactions between separations and while doing so preserve the quality expected by the DFE. The advantages of a 4-to-4 cascaded color management strategy are that it allows the use of one DFE while driving multiple print engines with the fleet profile so that the overall engine cost for a multi-engine system is low and it has a clean separation between the DFE and the engine. The advantages of the cascade strategy are that it can have one DFE with the fleet profile to drive a set of engines so that the cost will be lower; and that it has a clean separation between the DFE and the engine so that development of the DFE and the engine color management system can be separated.

Reference is now being made to FIG. 2 which shows a block diagram of the image path for printing CMYK images (e.g., GRACoL images) through the DFE. The system of FIG. 2 comprises of two primary components, i.e., a DFE 202 and a 4-to-4 Cascaded Color Management LUT 214. DFE 202 comprises a color transformation module 206 which, in this embodiment, receives CMYK images 204 and performs a GRACoL CMYK→L*a*b* transformation. Color transformation 206 produces L*a*b*/XYZ values 208. Output values 208 are provided to a colorimetric profile LUT 210 which performs a L*a*b*/XYZ→CMYK conversion, via a lookup table, and produces CMYK values 212. The DFE provides CMYK values 212 to reference printer model 216 which performs a CMYK→L*a*b* color transformation. Reference printer model 216 produces aim L*a*b* values 218 for processing the aim values inside CMYK Preserved Profile LUT 220. An output from block 220 is device CMYK values 222 which are provided to a drifted printer 224 wherein the input CMYK values are used to produce L*a*b* values 226.

Reference is now being made to FIG. 3 which illustrates a block diagram which mirrors the configuration of FIG. 2 showing a printer model and inverse printer of printer models in the DFE and Print Engine image paths.

In FIG. 3, DFE 302 comprises a color transformation module 306 ($\hat{P}_{GRACoL}$) which receives CMYK images 304 and performs a CMYK→L*a*b* transformation to obtain L*a*b*/XYZ values 308. Values 208 are provided to inverse profile LUT 310 ($\hat{P}_{reference}^{-1}$) which produces CMYK values 312. The DFE provides CMYK values 312 to reference printer model 316 ($\hat{P}_{reference}$) which performs a CMYK→L*a*b* color transformation to obtain aim L*a*b* values 318 for processing the aim values inside CMYK Preserved Profile LUT 320 ($\hat{P}_{drifted}^{-1}$), as described above with respect to FIG. 2. Device CMYK values 322 which are provided to drifted printer 324 ($\hat{P}_{drifted}$) wherein the input CMYK values are used to produce L*a*b* values 326. In this embodiment, block 320 is the inverse of the drifted printer so that, if an ideal inverse can be found, the combined transfer relationships between the CMYK preserved profile LUT 320 and drifted printer 324 will cancel out. Then the resulting L*a*b* from the drifted printer will be nearly equal to the aim values except for out-of-gamut L*a*b* aims. The inverse of the drifted printer should preserve or contain the DFE GCR. Otherwise, the 4-to-4 cascaded color management LUT 214 will not produce proper device CMYK values for the drifted printer to result in expected image quality in documents. It is also important that a reference printer model 316 be used which is the same or substantially similar to the one used inside the DFE. Also in this embodiment, a color sensing device 328, such as an in-line spectrophotometer (ILS), repeatedly obtains measurements from the printed page and those measurements are used to update the gray component replacement constrained 4×4 profile LUT 320. When the engine drifts, the 4-to-4 CMYK to CMYK LUT is continually updated to overcome the change in color so that the customers do not see the change.

Example Flow Diagram

Figure 4:
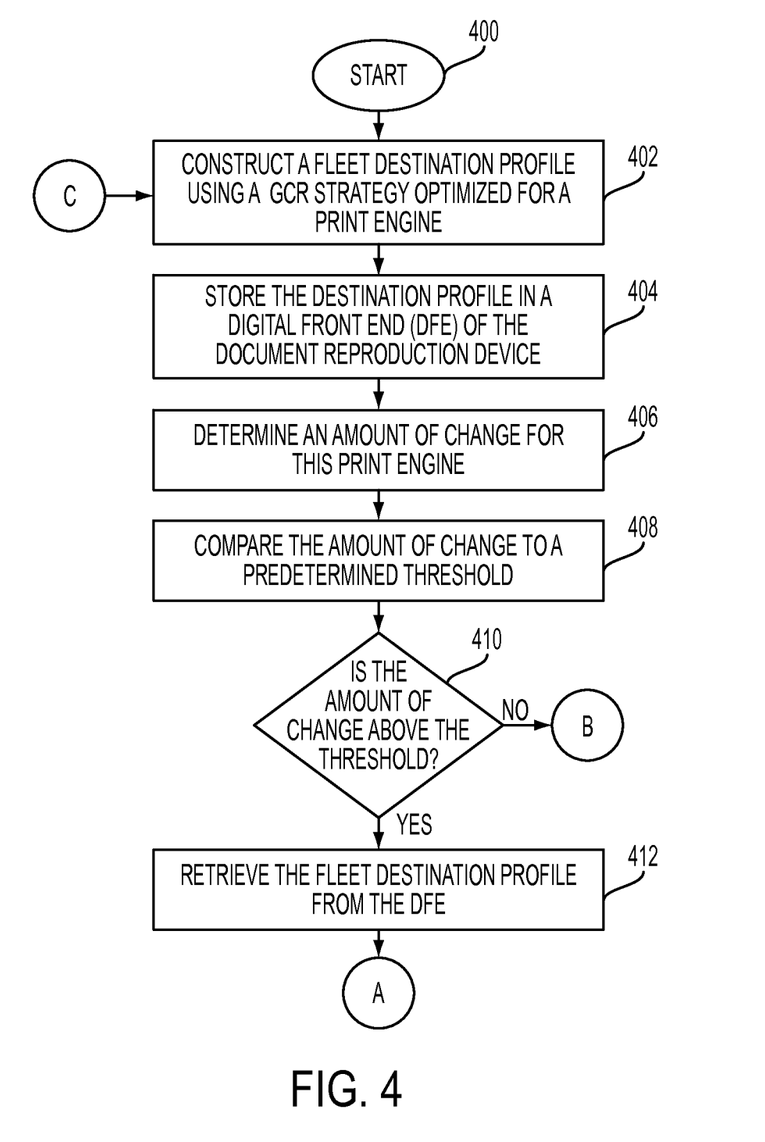
FIG. 4 is a flow diagram of one example embodiment of the present method for compensating for a determined amount of change in a print engine, to maintain color consistency in a document reproduction system.
Figure 5:
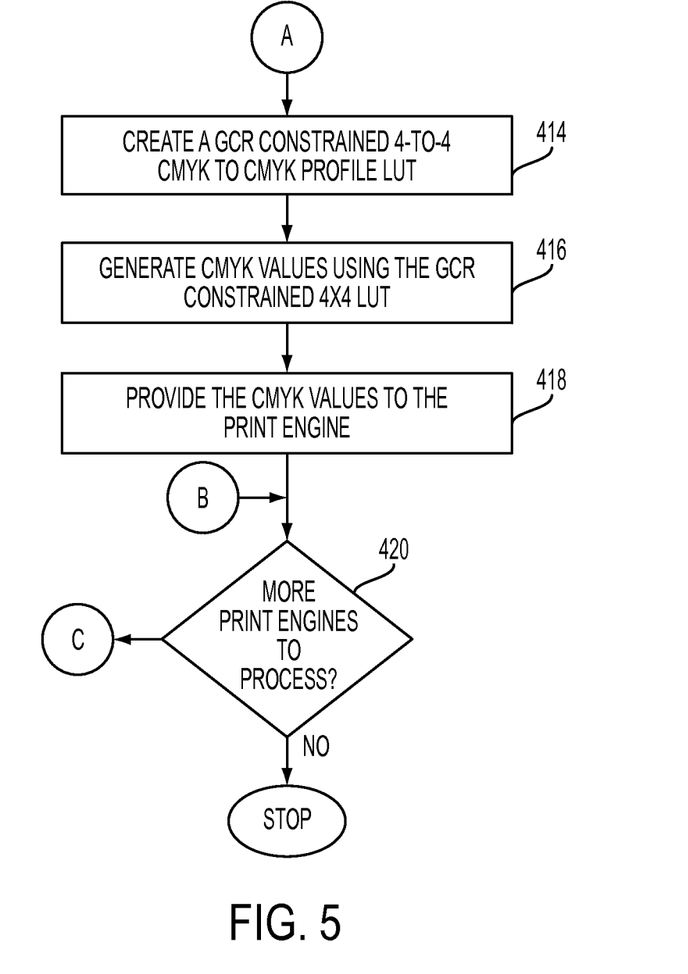
FIG. 5 is a continuation of the flow diagram of FIG. 4 with flow processing continuing with respect to node A.

Reference is now being made to the flow diagrams of FIGS. 4 and 5 which collectively illustrate one example embodiment of the present method for compensating for an amount of change in a print engine to maintain color consistency in a document reproduction system. Flow processing begins at step 400 and immediately proceeds to step 402.

At step 402, a fleet destination profile is constructed using a gray component replacement strategy which has been optimized for a target print engine of a document reproduction device. The target print engine is intended to be examined for a change which adversely impacts the quality of an output print rendered thereby.

At step 404, the fleet destination profile is stored in a digital front end (DFE) of a cascaded color management system. The fleet destination profile can be stored to a memory or a storage device accessible by the DFE or communicated to a remote storage device over a network using a communications interface such as, for example, a network interface card or router.

At step 406, determine an amount of change in a quality of an output print rendered using of a target print engine. In one embodiment, the change in output quality is a result of the print engine having drifted. Methods for determining an amount of drift, for example, of a print engine are well established and depend, to a large extend, on the type of engine under examination and the media substrate being used.

At step 408, the determined amount of change is compared to a predetermined threshold. Such a threshold would preferably be predetermined by a device designer or a device technician who is readily familiar with the acceptable operating parameters for the target print engine being examined.

At step 410, a determination is made whether the amount of change determined in step 408 exceeds the predetermined threshold. If the amount of change does not exceed the predetermined threshold then processing continues with respect to node B of FIG. 5 wherein, at step 420, a determination is made whether more print engines remain to be processed. If the determined amount of change exceeds the predetermined threshold then, at step 412, the fleet destination profile is retrieved from the digital front end (DFE).

Reference is now being made to the flow diagram of FIG. 5 which is a continuation of the flow diagram of FIG. 4 with flow processing continuing with respect to node A.

At step 414, create a gray component replacement constrained 4-to-4 CMYK to CMYK profile LUT. In various embodiments, creating the gray component replacement constrained 4×4 profile LUT involves creating a 3-to-4 L*a*b* to CMYK profile LUT and concatenating the created 3×4 profile LUT with a fleet printer model to obtain the 4×4 profile LUT. The gray component replacement constrained 4×4 profile LUT may be communicated to a storage device or to a remote device over a network. In an alternative embodiment, measurements are obtained from a color sensing device and used, in a feedback loop, to update the gray component replacement constrained 4×4 profile LUT. Such an alternative embodiment is shown and discussed with respect to the block diagram of FIG. 3.

At step 416, generate CMYK values using the created GCR constrained 4×4 profile LUT created in step 414.

At step 418, provide the generated CMYK values to the print engine. The print engine utilizes the generated CMYK values to maintain color consistency in the output prints being produced by the document reproduction device. The generated CMYK values may be provided to a storage device for subsequent retrieval or communicated to a remote device over a network. These CMYK values may further be provided to other document reproduction devices with similarly configured print engines having a similar amount of determined change in the quality of an output print.

At step 420, a determination is made whether any more print engines remain to be processed in accordance with the teachings hereof. If so then processing continues with respect to node C wherein, at step 402, a fleet destination profile is constructed using a GCR strategy which has been optimized for a next print engine. Processing repeats in such a manner until all print engines of the document reproduction device being examined have been processed accordingly. Thereafter, further processing, in this embodiment, stops.

It should be understood that the flow diagrams depicted herein are illustrative. One or more of the operations illustrated in any of the flow diagrams may be performed in a differing order. Other operations, for example, may be added, modified, enhanced, condensed, integrated, or consolidated. Variations thereof are envisioned, and are intended to fall within the scope of the appended claims. All or portions of the flow diagrams may be implemented partially or fully in hardware in conjunction with machine executable instructions in communication with various components of such a system.

Example Workflows

As discussed above, if access is not available to the DFE profile, then additional process steps in the 4×4 workflow are needed in which a patch file (e.g., RGB or L*a*b*) is processed through the DFE profiles to extract device CMYK values. The following describes the process steps for two different workflows (RGB and CMYK).

RGB Workflow:

If we use the RGB path, then a patch file is constructed with the RGB grid values. We assume that an RGB standard is defined and access is available to the RGB to L*a*b* source profile or transform (e.g., a source profile LUT or equations or a matrix). All computations can be done inside the engine. Following processing steps are used to inherit the GCR LUT.

1) Construct a densely populated RGB grid (e.g., $100^3$ or so).
2) Process the RGB values from step 1 through the source profile (e.g., sRGB profile) to produce L*a*b* values.
3) Create a patch file with RGB values from step 1. Process the patch file inside the DFE using the RGB to CMYK profile and obtain corresponding CMYK values emitted by the DFE. Associate each L*a*b* value in step 2 to corresponding CMYK value emitted by the DFE in step 3.
4) Obtain a $33^3$ RGB grid and create the corresponding L*a*b* values (called L*a*b* nodes) using appropriate color space transforms (e.g., genRGB color space). This color space transform is used while constructing the printer inverse map for the drifted printer inside the print engine.
5) Compare the node L*a*b* values from step 4 to L*a*b* values from step 2. Associate each resulting nearest L*a*b* value in step 2 and its corresponding CMYK value from step 3 to the node L*a*b* value of step 4. Obtain a L*a*b* to CMYK LUT for each L*a*b* node value. These CMYK values now represent the inherited GCR. They are used in the inversion process.

Note that if the DFE can be made to honor the source profile of an image, or the source profile can be set by any other means, a simpler technique can be applied.

a) Obtain a $33^3$ RGB grid and create the corresponding L*a*b* values (called the L*a*b* nodes) using appropriate color space transforms (e.g., genRGB color space). This color space transform is used while constructing the printer inverse map for the drifted printer inside the print engine.
b) Create an image with these RGB patch values, embed an ICC profile that describes the RGB space, or set the source profile by some other means.
c) Process this image through the DFE with the appropriate source profile settings to obtain the corresponding CMYK values emitted by the DFE.
d) Associate each L*a*b* value in step a to the corresponding CMYK value emitted by the DFE in step c. These CMYK values now represent the inherited GCR. They are used in the inversion process.

CMYK Workflow:

If a CMYK path is used, assuming the CMYK path adheres to GRACoL/FOGRA or other known standards, the following steps may be used to create the inherited GCR.

6) Construct a densely populated CMYK grid (e.g., $30^4$ or so).
7) Process the CMYK values from step 5 above through the source profile (e.g., GRACoL profile) to produce L*a*b* values.
8) Create a patch file with CMYK values from step 6. Process the patch file inside the DFE using the CMYK to CMYK profile and obtain corresponding CMYK values emitted by the DFE. Associate each L*a*b* value in step 7 to corresponding CMYK value emitted by the DFE in step 8.
9) Obtain a $33^3$ RGB grid and create the corresponding L*a*b* values (called L*a*b* nodes) using appropriate color space transforms (e.g., genRGB color space). This color space transform is used while constructing the printer inverse map of the drifted printer inside the print engine.
10) Compare the node L*a*b* values from step 9 to L*a*b* values from step 7. Associate each resulting nearest L*a*b* value in step 7 and its corresponding CMYK value from step 8 to the node L*a*b* value of step 9. Obtain a L*a*b* to CMYK table for each node L*a*b* value. Check whether this process results in multiple CMYK values associated with the same L*a*b* or multiple L*a*b* values associated with the same CMYK. Under such a scenario, the CMYK workflow does not result in proper GCR LUT. The L*a*b* to CMYK pair now correspond to the inherited GCR LUT. They are used in the inversion process.

If the resolution of the RGB or CMYK grid is not sufficiently dense, then the resulting inherited GCR LUT is susceptible to image artifacts such as contours. This can be prevented by pre-filtering or softening the inherited GCR LUT by using multi-dimensional smoothing algorithms. These CMYK values are used corresponding to each node L*a*b* values to calculate the gain matrices for inversion and gamut mapping. The profile LUT resulting from the inversion process is then concatenated with a fleet printer model using well known techniques to obtain a GCR constrained 4 to 4 CMYK to CMYK profile LUT.

In most cases, particularly with DFEs made by outside vendors, we may not have access to the reference or fleet printer model used by the DFE while constructing their profiles. It is important to note that, the new 4-to-4 cascaded strategy will only work when we have a correct reference or fleet printer model. This can be retrieved using the DFE L*a*b* to CMYK LUT resulting from process steps 3 and 8. Although we will only get LAB values for the CMYK combinations specified by the GCRs used in the DFE, these are the CMYK combinations of interest.

Updating the LUT

Figure 6:
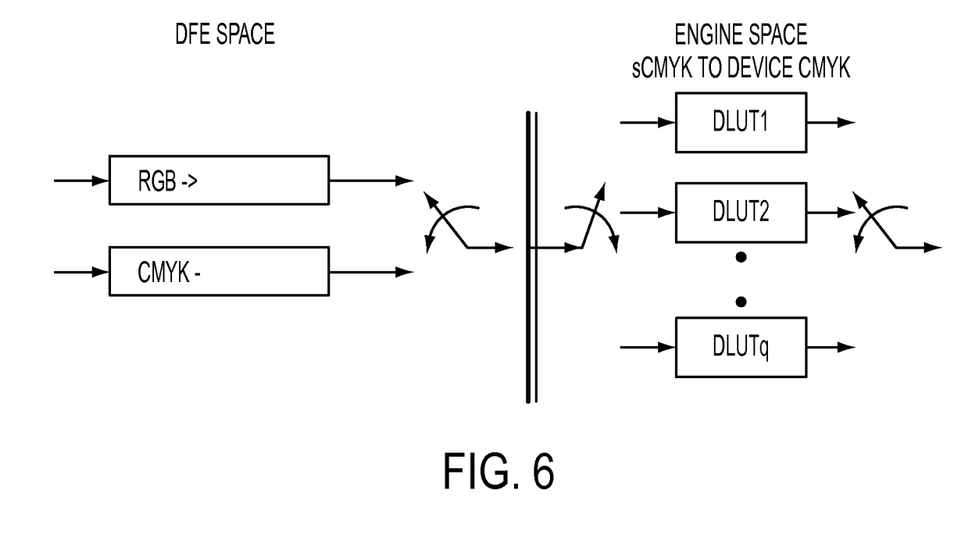
FIG. 6 is a schematic illustration of a cascade strategy.

Also presented herein is a method to update the LUT starting with a set of patches that either form a uniform grid of the LUT or can be projected to a uniform grid in the CMYK space. As stated previously, one primary goal of the color management system is to effectively transform variety of images to device CMYK color separations for printing by the engine. In the cascade strategy of color management, many elements of color management strategies such as mapping and GCR are handled inside the fleet profile that resides in the DFE, while the variation of the individual engine is handled by a multi-dimensional LUT that transforms from the fleet CMYK to the engine cmyk for printing and that resides inside the engine. A unique requirement from this strategy is to construct the LUT that preserves the color management strategy of the fleet profile in the DFE. When the engine changes due to drifting or component replacing, the LUT has to be updated. A generalized schematic of the cascade strategy is shown in FIG. 6.

One requirement for the 4×4 is that it must preserve the color management strategies such as the GCR of the fleet profile as much as possible. The updated 4×4 must also meet this requirement.

It should be appreciated that one of ordinary skill in this art would readily understand how to create a GCR constrained 4-to-4 CMYK to CMYK LUT. Many such methods are well known in the color science arts. The reader is respectfully directed to Chapter 7 of the above-identified text "*Control of Color Imaging Systems: Analysis and Design*".

Example Special Purpose Computer System

Figure 7:
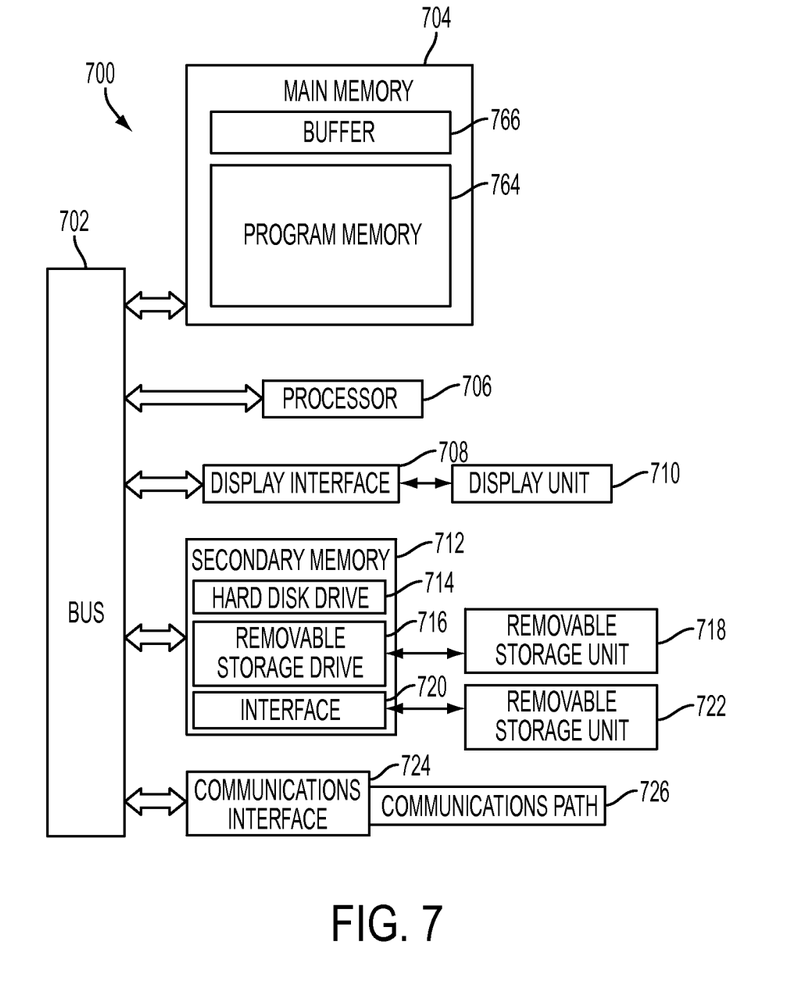
FIG. 7 illustrates a block diagram of one example embodiment of a special purpose computer system for implementing one or more aspects of the present method as described with respect to the flow diagrams of FIGS. 4 and 5.

Reference is now being made to FIG. 7 which illustrates a block diagram of one example embodiment of a special purpose computer system for implementing one or more aspects of the present method as described with respect to the flow diagrams of FIGS. 4 and 5. Such a special purpose processor is capable of executing machine executable program instructions. The special purpose processor may comprise any of a micro-processor or micro-controller, an ASIC, an electronic circuit, or special purpose computer. Such a computer can be integrated, in whole or in part, with a xerographic system or a color management or image processing system, which includes a processor capable of executing machine readable program instructions for carrying out one or more aspects of the present method.

Special purpose computer system 700 includes processor 706 for executing machine executable program instructions for carrying out all or some of the present method. The processor is in communication with bus 702. The system includes main memory 704 for storing machine readable instructions. Main memory may comprise random access memory (RAM) to support reprogramming and flexible data storage. Buffer 766 stores data addressable by the processor. Program memory 764 stores machine readable instructions for performing the present method. A display interface 708 forwards data from bus 702 to display 710. Secondary memory 712 includes a hard disk 714 and storage device 716 capable of reading/writing to removable storage unit 718, such as a floppy disk, magnetic tape, optical disk, etc. Secondary memory 712 may further include other mechanisms for allowing programs and/or machine executable instructions to be loaded onto the processor. Such mechanisms may include, for example, a storage unit 722 adapted to exchange data through interface 720 which enables the transfer of software and data. The system includes a communications interface 724 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 726 which carries such signals and may be implemented using wire, cable, fiber optic, phone line, cellular link, RF, memory, or other means known in the arts.

The methods described can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine, that is in turn capable of implementing one or more elements of the flow diagrams provided herewith, or portions thereof, can be used. The teachings hereof can be implemented in hardware or software using any known or later developed systems, structures, devices, and/or software by those skilled in the applicable art without undue experimentation from the functional description provided herein with a general knowledge of the relevant arts. The methods hereof can be implemented as a routine embedded on a personal computer or as a resource residing on a server or workstation, such as a routine embedded in a plug-in, a photocopier, a driver, a scanner, a photographic system, a xerographic device, or the like.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for compensating for print engine change to maintain color consistency in a document reproduction system, the method comprising:
    storing a fleet destination profile in a digital front end (DFE) of a cascaded color management system, said fleet destination profile having been constructed using a gray component replacement (GCR) strategy optimized for a given print engine of a document reproduction device;
    determining an amount of change in an output quality of said print engine; and
    in response to said amount of change being above a predetermined threshold:
        retrieving said fleet destination profile from said DFE which contains a L*a*b* to CMYK profile LUT;
        creating a 3-to-4 L*a*b* to CMYK profile LUT;
        concatenating said 3-to-4 L*a*b* to CMYK profile LUT with a fleet printer model to obtain GCR constrained 4-to-4 CMYK to CMYK profile LUT;
        generating CMYK values using said GCR constrained 4-to-4 CMYK to CMYK profile LUT; and
        providing said generated CMYK values to said print engine to maintain color consistency in said document reproduction device.

2. The method of claim 1, further comprising:
    obtaining measurements from a color sensing device; and
    using said obtained measurements to update said GCR constrained 4-to-4 CMYK to CMYK profile LUT.

3. The method of claim 1, further comprising storing said GCR constrained 4-to-4 CMYK to CMYK profile LUT to a storage device.

4. The method of claim 1, wherein said change in output quality of said print engine is due to engine drift.

5. A system for compensating for print engine change to maintain color consistency in a document reproduction system, the system comprising:
    a digital front end (DFE) in communication with a memory; and
    a processor in communication with said DFE, said processor executing machine readable instructions for performing the method of:
        constructing a fleet destination profile using a gray component replacement (GCR) strategy which has been optimized for a given print engine of a document reproduction device;
        storing said fleet destination profile in said DFE;
        determining an amount of change in an output quality of said print engine; and
        in response to said amount of change being above a predetermined threshold:
            retrieving said stored fleet destination profile from said DFE which contains a L*a*b* to CMYK profile LUT;
            creating a 3-to-4 L*a*b* to CMYK profile LUT;
            concatenating said 3-to-4 L*a*b* to CMYK profile LUT with a fleet printer model to obtain a GCR constrained 4-to-4 CMYK to CMYK profile LUT;
            generating CMYK values using said created GCR constrained 4-to-4 CMYK to CMYK profile LUT; and
            providing said generated CMYK values to said print engine to maintain color consistency in said document reproduction device.

6. The system of claim 5, further comprising:
    obtaining measurements from a color sensing device; and
    using said obtained measurements to update said GCR constrained 4-to-4 CMYK to CMYK profile LUT.

7. The system of claim 5, further comprising storing said GCR constrained 4-to-4 CMYK to CMYK profile LUT to a storage device.

8. The system of claim 5, wherein said change in output quality of said print engine is due to engine drift.

* * * * *